United States Patent Office 3,320,285
Patented May 16, 1967

3,320,285
PROCESS FOR THE PREPARATION OF SUBSTITUTED γ-LACTONES FROM TETRAHYDROTHIAPYRAN-1,1-DIOXIDES AND PRODUCT
Jacques Martel, Bondy, and Chanh Huynh, Villemomble, France, assignors to Roussel-Uclaf, S.A., Paris, France, a corporation of France
No Drawing. Filed Aug. 3, 1965, Ser. No. 477,013
Claims priority, application France, Aug. 6, 1964, 984,411
4 Claims. (Cl. 260—343.6)

The present invention relates to a process for the preparation of substituted γ-lactones as well as the new products obtained by this process.

More particularly, the invention relates to a process for the preparation of γ-lactones of the general formula:

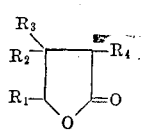

wherein $R_1$ represents a hydrogen, a vinyl radical, substituted or unsubstituted, in particular, isobutenyl, or a phenyl radical, substituted or unsubstituted; $R_2$ and $R_3$ represent a hydrogen, an alkyl radical, an aryl radical which can have one or several substituents, especially lower alkyls, alkoxys or halogens, or forming together a ring containing from 3 to 7 carbon atoms; $R_4$ represents a hydrogen or a lower alkyl radical.

In a general manner, the γ-lactones are very interesting chemical compounds in various fields. These compounds may serve as starting materials for the preparation of acids substituted in the γ position, for example by an alcohol, amine, halogen or nitrile group.

Furthermore, the γ-lactonic cycle is present in the structure of a great number of natural substances, in particular in compounds belonging to the terpenic series, or to the steroidic series or even to pantolactone, a product of degradation of pantothenic acid and an intermediate for the synthesis of the latter.

The substituted γ-lactones obtained by the process of the invention, particularly those produced by the examples, possess the general properties of γ-lactones, in particular their capability to produce variously substituted acids by opening of the lactone ring. Furthermore, Julia (Bull. Soc. Chim. 1964, 1, 487) has evidenced the particular importance of the lactone of 3,3,6-trimethyl 4-hydroxy 5-heptene 1-oic acid since he succeeded in transforming it into ethyl chrysanthemate, a compound most valuable for the preparation of insecticides of the allethrine and pyrethrine type. Moreover, the γ-lactones of the invention possess themselves another interesting feature, being endowed with a biological activity which renders them suitable for agriculture as pesticides (herbicides, insecticides, fungicides, etc.). Furthermore, it should be noted that one of them, the γ-lactone of 3,3,6-trimethyl-4-hydroxy-5-hepten-1-oic acid, is an isomer of pyrocine, the γ-lactone of 3 - isobutenyl-4-methyl-4-hydroxy-pentan-1-oic acid which has insecticidal properties (Bull. Soc. Chim. 1962, 2, 243).

An object of the present invention is the development of a process for the preparation of a γ-lactone of the formula

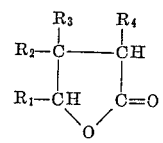

wherein $R_1$ is a member selected from the group consisting of hydrogen, vinyl, substituted vinyl, phenyl and substituted phenyl; $R_2$ and $R_3$ are members selected from the group consisting of hydrogen, alkyl, aryl, substituted aryl, and, when taken together, form a ring containing from three to seven carbon atoms; and $R_4$ is a member selected from the group consisting of hydrogen and lower alkyl, which comprises the steps of treating a tetrahydrothiapyran-1,1-dioxide of the formula

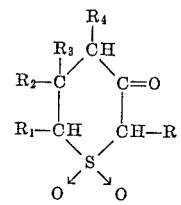

wherein $R_1$, $R_2$, $R_3$ and $R_4$ have the above-indicated meanings and R is a member selected from the group consisting of hydrogen, vinyl, substituted vinyl, phenyl and substituted phenyl, in an aqueous media in the presence of a basic agent, and recovering the said γ-lactone.

Another object of the present invention is the development of a process for the preparation of a γ-lactone of the formula

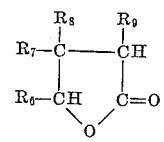

wherein $R_6$ is a member selected from the group consisting of hydrogen, lower-$\Delta^1$-alkenyl, phenyl, lower-alkyl-phenyl, halophenyl and lower-alkoxyphenyl; $R_7$ and $R_8$ are members selected from the group consisting of hydrogen, lower alkyl, phenyl, lower-alkyl-phenyl, halophenyl and lower-alkoxy-phenyl, and, when taken together, alkylene having from two to six carbon atoms; and $R_9$ is a member selected from the group consisting of hydrogen and lower alkyl, which comprises the steps of heating to reflux a tetrahydrothiapyran-1,1-dioxide of the formula

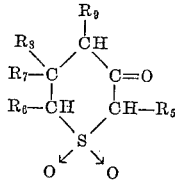

wherein $R_6$, $R_7$, $R_8$ and $R_9$ have the above-indicated meanings and $R_5$ is a member selected from the group consisting of hydrogen, lower-$\Delta^1$-alkenyl, phenyl, lower-alkyl-phenyl, halophenyl and lower-alkoxyphenyl, in an aqueous media in the presence of a basic agent selected from the group consisting of ammonium hydroxide, alkali metal hydroxides, alkali metal carbonates and alkaline earth hydroxides, acidifying and recovering said γ-lactone.

A further object of the invention is the obtention of the lactone of 3,3,6-trimethyl-4-hydroxy-5-hepten-1-oic acid, and the lactone of 3-phenyl-6-methyl-4-hydroxy-5-hepten-1-oic acid.

These and other objects of the present invention will become more apparent as the description thereof proceeds.

The process of the invention is shown by the following flow diagram:

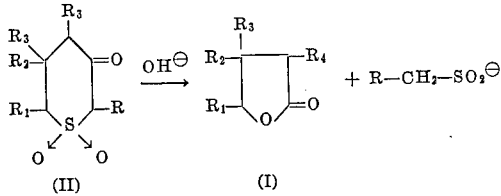

wherein R, $R_1$, $R_2$, $R_3$ and $R_4$ have the above-indicated meanings.

The process of the invention is characterized in that a cyclic β-ketonic sulfone, a derivative of a tetrahydrothiapyran of the general Formula II:

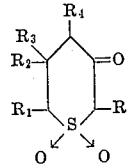

wherein $R_1$, $R_2$, $R_3$ and $R_4$ have the above-indicated meanings and wherein R represents a hydrogen, a vinyl radical, substituted or unsubstituted, or a phenyl radical, substituted or unsubstituted, is subjected to the action of a basic agent in aqueous media, thus obtaining, with elimination of the sulfinic ion $R-CH_2-SO_2^\ominus$, the corresponding γ-lactone of the general Formula I, wherein $R_1$, $R_2$, $R_3$ and $R_4$ maintain the above-indicated meanings.

The starting compounds, the cyclic sulfones II, are easily prepared by action of a sulfonic such as

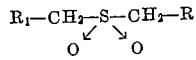

on an ester of acrylic acids, substituted or unsubstituted. These cyclic sulfones II as well as the process of making the same are described in the copending, commonly-assigned United States Patent application Ser. No. 468,625, filed June 30, 1965.

This new process for the preparation of γ-lactones is entirely original. Moreover, it is simple and very general in its application. It allows, in fact, the obtention of diversely substituted γ-lactones of the Formula I in a single step starting with the cyclic sulfones II which themselves are easily accessible.

According to the invention the cyclic sulfones II are treated in an aqueous medium with a basic agent, in particular an alkaline base, preferably an alkali metal hydroxide such as potassium hydroxide, sodium hydroxide, an alkali metal carbonate, ammonium hydroxide, or an alkaline earth hydroxide, such as baryta. The reaction may be effected in the presence of an additional water-miscible organic solvent, for example an alcohol such as the lower alkanols, methanol, ethanol, or glycols such as diethyleneglycol, or a substituted amide, preferably a di-lower-alkyl-amide of a lower alkanoic acid, such as dimethylformamide, or an ether, preferably an aliphatic ether or a cyclic ether, such as dioxane. The reaction is conducted at elevated temperatures, preferably at the reflux temperature. The desired product of Formula I can be recovered by customary methods, preferably by separation of the γ-lactone from the water-soluble sulfinic reaction product by solvent extraction.

It is also preferable to acidify the reaction mixture before recovering the γ-lactone.

In a method of execution actually preferred, the sulfones II are transformed into the corresponding γ-lactones I by heating to reflux in an aqueous potassium hydroxide solution, followed by acidification of the reaction mixture at the end of the reaction and recovery by solvent extraction.

As starting sulfones of Formula II can be mentioned those compounds wherein R and $R_1$ are hydrogen, phenyl, p-chlorophenyl, o-methoxyphenyl, p-methylphenyl, 2-methyl-1-propenyl (isobutenyl), vinyl, etc., or any combinations thereof; $R_2$ and $R_3$ are hydrogen, methyl, phenyl, cyclohexanyl, o-methoxyphenyl, o-chlorophenyl, etc., or any combination thereof; $R_4$ is hydrogen, methyl, etc. Preferably the starting sulfones are 2-isobutenyl-3,3-dimethyl-5-oxo-tetrahydrothiapyran-1,1-dioxide and 2-isobutenyl-3-phenyl-5-oxo-tetrahydrothiapyran-1,1-dioxide.

The invention also extends to new γ-lactones obtained by this process, in particular to:

The lactone of 3,3,6-trimethyl-4-hydroxy-5-hepten-1-oic acid,

The lactone of 3-phenyl-6-methyl-4-hydroxy-5-hepten-1-oic acid.

The following examples will serve for better comprehension of the invention. However, it is to be understood that they do not limit the invention in any manner.

*Example I.—Preparation of the lactone of 3,3,6-trimethyl-4-hydroxy-5-hepten-1-oic acid*

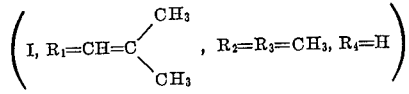

1.8 gm. of 2-isobutenyl-3,3-dimethyl-5-oxo-tetrahydrothiapyran-1,1-dioxide

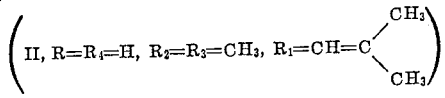

was added to 50 cc. of 3 N aqueous potassium hydroxide solution and the reaction mixture was heated at reflux for 6 hours.

Thereafter, the mixture was cooled, acidified by addition of hydrochloric acid and extracted with methylene chloride. The organic phase was washed first with a sodium bicarbonate solution, then with water until the wash waters were neutral and dried. Thereafter, the solvent was removed and the residue was crystallized by trituration from isopropyl ether.

The crystallization of the product thus obtained, from petroleum ether (with a boiling point of 60° to 80° C.) yielded 1.279 gm. of lactone of 3,3,6-trimethyl-4-hydroxy-5-hepten-1-oic acid

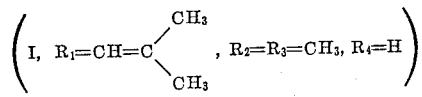

having a melting point of about 50° C.

The product occurred in the form of colorless crystals, insoluble in water, soluble in dilute aqueous alkalis and in most of the usual organic solvents.

*Analysis.*—$C_{10}H_{16}O_2$; molecular weight=168.23. Calculated: C, 71.39%; H, 9.58%. Found: C, 71.5%; H, 9.6%.

This compound is not described in the literature.

*Example II.—Preparation of the lactone of 3-phenyl-6-methyl-4-hydroxy-5-hepten-1-oic acid*

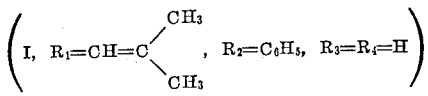

1 gm. of 2-isobutenyl-3-phenyl-5-oxo tetrahydrothiapyran-1,1-dioxide

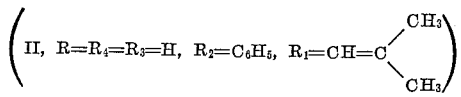

(II, $R=R_4=R_3=H$, $R_2=C_6H_5$, $R_1=CH=C\diagup_{CH_3}^{CH_3}$)

was added to 25 cc. of 3 N aqueous potassium hydroxide solution, and the reaction mixture was heated at reflux for about 15 hours.

Next, the mixture was cooled, diluted with water, the aqueous alkaline phase was extracted with ether and then acidified by the addition of concentrated hydrochloric acid. The precipitate formed was extracted with methylene chloride. The organic phase was washed first with sodium bicarbonate solution, then with water, dried, and the solvent was removed.

The lactone of 3-phenyl-6-methyl-4-hydroxy-5-hepten-1-oic acid

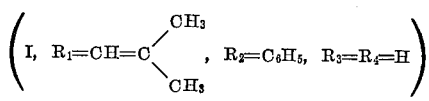

(I, $R_1=CH=C\diagup_{CH_3}^{CH_3}$, $R_2=C_6H_5$, $R_3=R_4=H$)

was obtained, having a melting point of 53 to 54° C.

The product occurred in the form of colorless prisms, insoluble in water, soluble in hot dilute aqueous alkalis and in most of the common organic solvents.

Analysis.—$C_{14}H_{16}O_2$; molecular weight=216.27. Calculated: C, 77.75%; H, 7.46%. Found: C, 77.9%; H, 7.5%.

This compound is not described in the literature.

The starting sulfones of Formula II utilized in the examples are described in Ser. No. 468,625, filed June 30, 1965.

The preceding specific embodiments are illustrative of the invention. It is to be understood, however, that other expedients known to those skilled in the art may be employed without departing from the spirit of the invention or the scope of the appended claims.

We claim:
1. The lactone of 3-phenyl-6-methyl-4-hydroxy-5-hepten-1-oic acid.
2. A process for the preparation of a γ-lactone of the formula

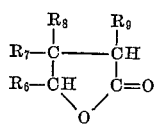

wherein $R_6$ is a member selected from the group consisting of hydrogen, lower-$\Delta^1$-alkenyl, phenyl, lower-alkyl-phenyl, halophenyl and lower-alkoxyphenyl; $R_7$ and $R_8$ are members selected from the group consisting of hydrogen, lower alkyl, phenyl, lower-alkyl-phenyl, halophenyl and lower-alkoxyphenyl, and, when taken together, alkylene having from two to six carbon atoms; and $R_9$ is a member selected from the group consisting of hydrogen and lower alkyl, which comprises the steps of treating a tetrahydrothiapyran-1,1-dioxide of the formula

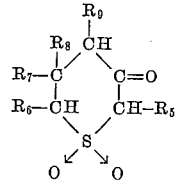

wherein $R_6$, $R_7$, $R_8$ and $R_9$ have the above-indicated meanings and $R_5$ is a member selected from the group consisting of hydrogen, lower-$\Delta^1$-alkenyl, phenyl, lower-alkyl-phenyl, halophenyl and lower-alkoxyphenyl, in an aqueous media in the presence of a basic agent selected from the group consisting of ammonium hydroxide, alkali metal hydroxides, alkali metal carbonates and alkaline earth hydroxides, and recovering said γ-lactone.

3. A process for the preparation of a γ-lactone of the formula

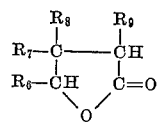

wherein $R_6$ is a member selected from the group consisting of hydrogen, lower-$\Delta^1$-alkenyl, phenyl, lower-alkyl-phenyl, halophenyl and lower-alkoxyphenyl; $R_7$ and $R_8$ are members selected from the group consisting of hydrogen, lower alkyl, phenyl, lower-alkyl-phenyl, halophenyl and lower-alkoxyphenyl, and, when taken together, alkylene having from two to six carbon atoms; and $R_9$ is a member selected from the group consisting of hydrogen and lower alkyl, which comprises the steps of heating to reflux a tetrahydrothiapyran-1,1-dioxide of the formula

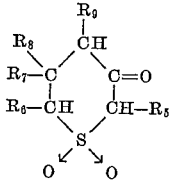

wherein $R_6$, $R_7$, $R_8$ and $R_9$ have the above-indicated meanings and $R_5$ is a member selected from the group consisting of hydrogen, lower-$\Delta^1$-alkenyl, phenyl, lower-alkyl-phenyl, halophenyl and lower-alkoxyphenyl, in an aqueous media in the presence of a basic agent selected from the group consisting of ammonium hydroxide, alkali metal hydroxides, alkali metal carbonates and alkaline earth hydroxides, acidifying and recovering said γ-lactone.

4. The process according to claim 3 wherein said basic agent in an aqueous media is an aqueous solution of potassium hydroxide.

References Cited by the Examiner

Korte et al.: Justus Liebigs Annalen de Chemie, 664: 101 (1963).

ALEX MAZEL, *Primary Examiner.*

J. A. NARCAVAGE, *Assistant Examiner.*